United States Patent [19]

Keith

[11] Patent Number: 4,592,124

[45] Date of Patent: Jun. 3, 1986

[54] ACCESSORY PULLEY INSTALLATION TOOL

[75] Inventor: Herman G. Keith, Rte. 2, Box 431, Henagar, Ala. 35978

[73] Assignees: Herman G. Keith; John M. Keith, both of Henagar, Ala.

[21] Appl. No.: 627,681

[22] Filed: Jul. 5, 1984

[51] Int. Cl.4 .................................. B23P 19/02

[52] U.S. Cl. .................................. 29/264; 29/266

[58] Field of Search .................. 29/263, 264, 256, 258, 29/266

[56] References Cited

U.S. PATENT DOCUMENTS

| | | | |
|---|---|---|---|
| 1,395,587 | 11/1921 | McLachlan | 29/264 X |
| 3,584,365 | 6/1971 | Cuen et al. | 29/256 |
| 3,862,483 | 1/1975 | Kloster | 29/263 X |
| 4,209,888 | 7/1980 | Glasscock et al. | 29/263 |
| 4,259,774 | 4/1981 | Dolinski et al. | 29/263 |
| 4,457,061 | 7/1984 | Eason | 29/264 |
| 4,472,869 | 9/1984 | Yasui et al. | 29/264 X |

*Primary Examiner*—Frederick R. Schmidt
*Assistant Examiner*—Steven P. Schad
*Attorney, Agent, or Firm*—Harvey B. Jacobson

[57] ABSTRACT

An elongated shank member is provided including a first end portion defining an endwise outwardly opening threaded bore therein for threaded engagement over a diametrically reduced threaded shaft end portion. A washer is also provided and is freely slidable on the second end portion of the shank member and the washer is of an outside diameter greater than the outside diameter of the first end portion of the shank member. A nut is provided and removably threadedly engaged on the second end of the shank member and is of size too great to be received through the center opening of the washer. Finally, a sleeve member is provided and is freely slidable on the shank member and abuttable by the washer. The second end portion of the shank member includes diametrically opposite flats and the first end portion of the shank member is of an outside diameter considerably greater than the outside diameter of the second end portion of the shank member. Also, the sleeve member includes a centrally apertured end wall through which the second end portion of the shank member is slidingly receivable and abuttable against the diametrically enlarged first end of the shank member.

1 Claim, 4 Drawing Figures

ACCESSORY PULLEY INSTALLATION TOOL

BACKGROUND OF THE INVENTION

Cummings diesel engines used in heavy duty trucks include a forward accessory drive shaft driven by the engine and upon which a pulley may be mounted for driving an accessory subsequently added to the truck. The accessory drive shaft projects toward and is disposed only slightly rearward of the radiator of the truck. Insufficient spacing between the free end of the shaft and the radiator is available to enable a pulley to be driven onto the shaft through the utilization of a conventional impact tool. In addition, the forward diametrically reduced terminal end of the shaft upon which a pulley retaining nut may be threaded is considerably axially shorter than the diametrically enlarged portion of the shaft disposed immediately rearward thereof upon which the pulley is to be mounted. Accordingly, the pulley may not be forced onto the diametrically enlarged portion of the shaft merely by using the pulley retaining nut and an appropriate washer to force the pulley rearward upon the enlarged shaft portion. Therefore, in order to install an accessory pulley the radiator of the truck must be removed or sufficiently loosened and shifted forward in order to provide sufficient clearance between the shaft forward end and the radiator to enable an impact tool to be used to effect installation of the pulley. The loosening and shifting of the radiator or the removal of the radiator involves approximately four man hours of labor.

Accordingly, a need exists for a tool by which a pulley may be mounted upon the accessory drive shaft of a Cummings diesel engine independent of shifting or removal of the associated radiator.

Various different tools heretofore have been provided to assist in pressing various members upon shaft ends. Examples of such tools are disclosed in U.S. Pat. Nos. 2,103,967, 3,050,840, 3,274,674, 3,584,365, 3,862,483, 4,209,888 and 4,235,004. However, these tools are not specifically designed to accomplish the desired function of the instant invention.

BRIEF DESCRIPTION OF THE INVENTION

The tool of the instant invention includes a shank member including a first end portion defining an endwise outwardly opening threaded bore therein for threaded mounting upon the diametrically reduced threaded free terminal end of the accessory drive shaft upon which a pulley is to be mounted. The shank member includes a diametrically reduced externally threaded second end having flats thereon engageable by a wrench to enable rotary input torque to be applied to the shank member and the first end of the shank is of an outside diameter slightly less than the shouldered portion of the accessory drive shaft upon which the accessory drive pulley is to be mounted. Accordingly, the accessory pulley may be slipped completely over the shank member. In addition, the tool further includes a large diameter washer receivable on the second end of the shank member as well as a nut removably threadedly engaged with the small end of the shank member and a sleeve member of an inside diameter slightly greater than the outside diameter of the first end of the shank member and including a centrally apertured end wall at one end which may be slipped over the second end of the shank member.

The main object of this invention is to provide a tool which will enable a pulley to be mounted upon a diametrically enlarged shoulder portion of a pulley drive shaft when very little axial clearance is available outward of the free end of the shaft.

Another object of this invention is to provide an accessory pulley installation tool which may be used to install a pulley upon an engine accessory drive shaft spaced closely rearward of an associated radiator and in a manner independent of the use of impact tools.

A final object of this invention to be specifically enumerated herein is to provide a tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts thoughout.

DETAILED DESCRIPTION OF THE INVENTION

Figure 1:
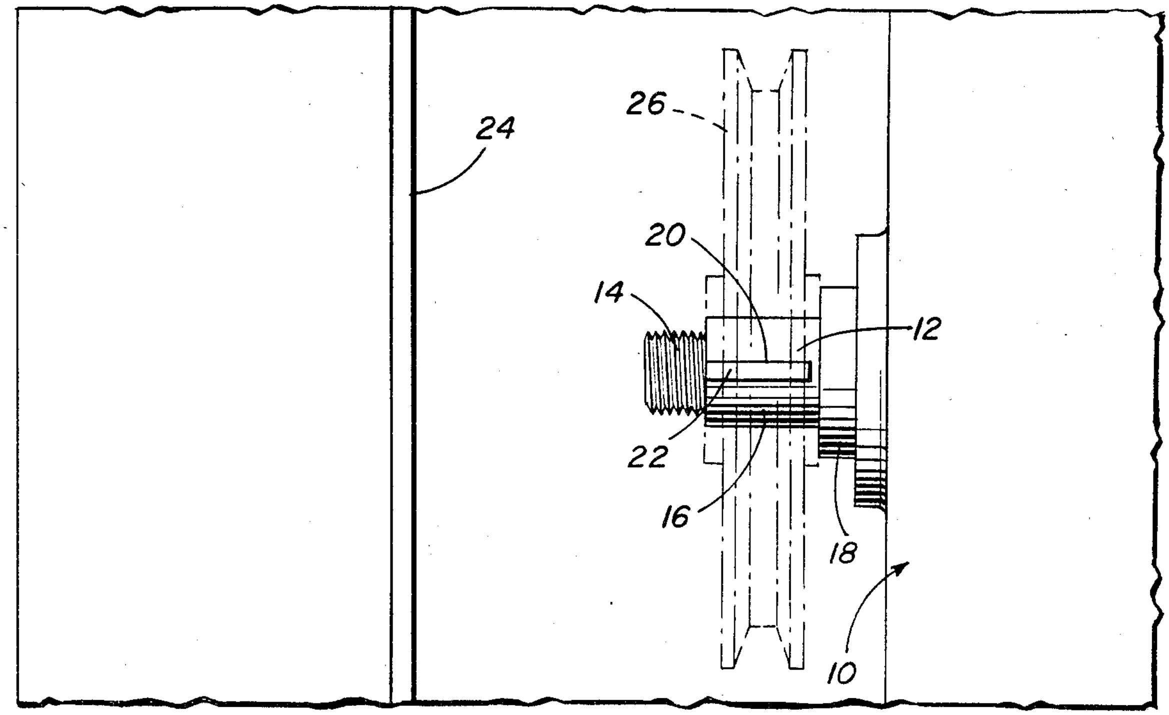
FIG. 1 is a side elevational view of the forward portion of a Cummings diesel engine illustrating the forwardly projecting accessory drive shaft of the engine and showing, schematically, the position of the associated radiator closely forward of the shaft.
Figure 2:
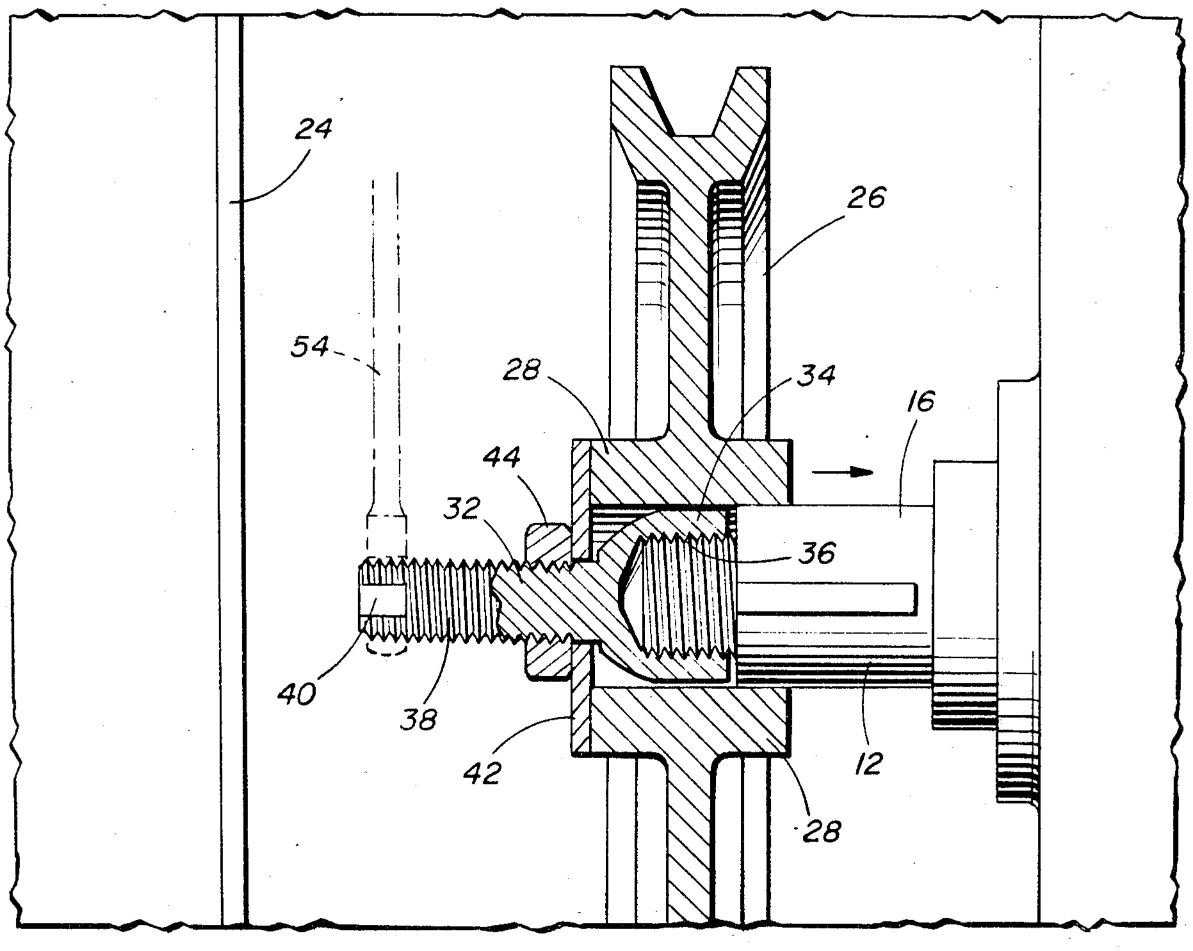
FIG. 2 is an enlarged elevational view similar to FIG. 1 but illustrating the tool of the instant invention and a drive pulley in vertical section with the tool being used to initially mount the pulley on the accessory drive shaft.
Figure 3:
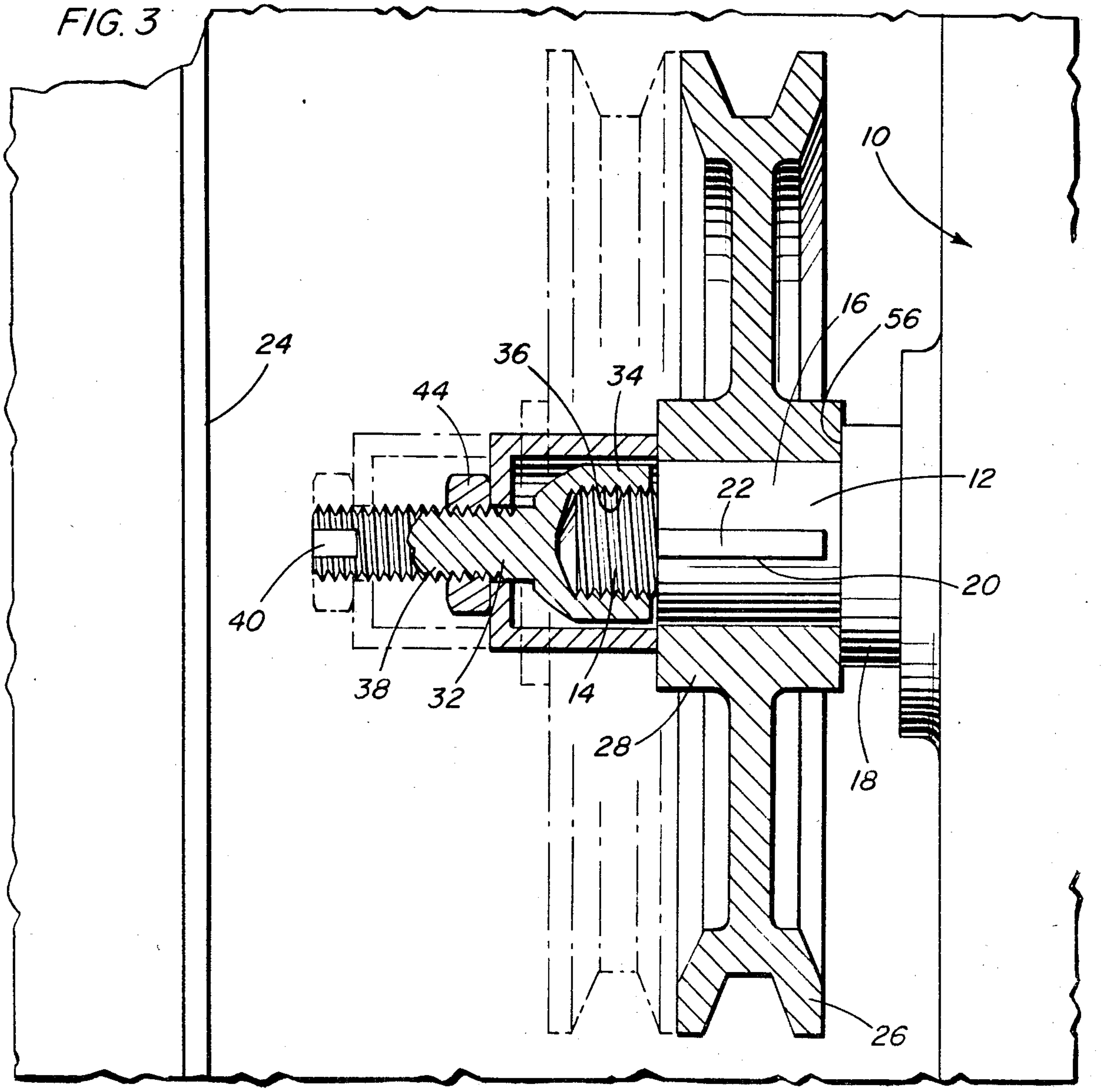
FIG. 3 is a side elevational view similar to FIG. 2 but illustrating the tool in operation displacing the accessory drive pulley to its final mounted position on the accessory drive shaft.

Referring now more specifically to FIGS. 1, 2 and 3 of the drawings the numeral 10 generally designates a Cummings diesel engine. The engine 10 includes a forwardly projecting accessory drive shaft 12 including a diametrially reduced and externally threaded forward end portion 14, a diametrically enlarged intermediate length portion 16 and a rear portion 18 of even greater diameter which projects forwardly from the engine 10.

The intermediate length portion 16 is equipped with a longitudinal keyway 20 in which a key 22 is receivable and it will be noted that the forward end portion 14 of the shaft 12 terminates approximately slightly more than three inches rearward of the rear portion of the associated radiator 24.

With attention invited now more specifically to FIG. 2 of the drawings, a drive pulley 26 is illustrated partially mounted upon the intermediate length portion 16 of the shaft 12, but if the pulley 26 was only slightly engaged with the intermediate length portion 16 the front end of the pulley would be spaced only approximately two and one-half inches rearward of the radiator 24 thereby effectively precluding the use of an impact tool upon the pulley 26 in order to drive the latter onto the intermediate length portion 16 of the shaft 12. Further, the use of an impact tool such as a hammer in such a restricted area could easily result in damage to the radiator 24 during the return stroke of the hammer preparatory to impacting the hammer with the forward end of the cylindrical hub portion 28 of the pulley 26.

Figure 4:
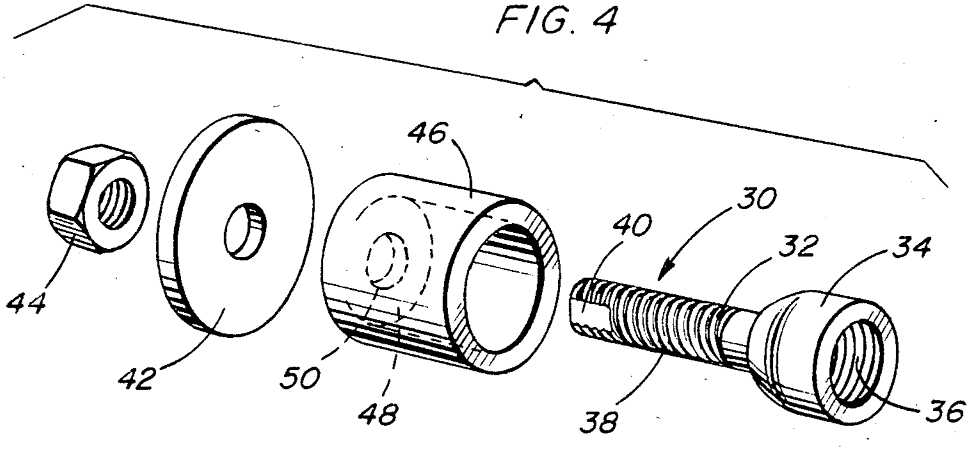
FIG. 4 is an exploded perspective view of the tool.

The tool of the instant invention is most clearly illustrated in FIG. 4 wherein it may be seen that the tool is referred to in general by the reference numeral 30. The tool 30 includes an elongated shank member 32 having a first diametrically enlarged end portion 34 in which an endwise outwardly opening blind threaded bore 36 is formed. The shank member 32 further includes a diametrically reduced second end portion 38 which is externally threaded and provided with diametrically opposite flats 40 on its free terminal end.

Also, the tool 30 includes a large diameter washer 42 which is slidable on the second end portion 38 and a nut 44 which may be threaded on the end portion 38 behind the washer 42. Further, the tool 30 additionally includes an elongated sleeve 46 of an inside diameter slightly greater than the outside diameter of the first end portion 34 of the shank member 32 and including an end wall 48 having a central aperture 50 formed therethrough in which the second end portion 38 is freely slidable.

In order to install the pulley 26 on the intermediate length portion 16 of the shaft 12 the pulley 26 is disposed over the threaded forward end portion 14 of the shaft 12 with the inner or right end of the hub portion 28 of the pulley 26 illustrated in FIG. 2 engaged with the outer or left end of the intermediate portion 16 of the shaft 12. Then, the first end portion 34 of the shank member 32 is inserted through the center of the hub portion 28 and threaded onto the forward end portion 14 of the shaft 12 through the utilization of an open end wrench 54 engaged with the flats 40. After the shank member 32 has been installed on the forward end portion 14 the washer 42 is slipped over the second end portion 38 of the shank member 32 and engaged with the outer or left end of the hub portion 28 of the pulley 26 and the nut 44 is threaded on the second end portion 38 behind the washer 42. Then, a suitable tool may be used to further thread the nut 44 on the second end portion 38 to utilize the washer 42 to initially force the hub portion 28 onto the intermediate length portion 16 of the shaft 12, the key 22 being previously placed in the keyway 20 and the pulley 26 being initially positioned with its keyway (not shown) aligned with the key 22.

After the nut has been threaded on the second end portion 38 to a position with the washer 42 abutted against the left end of the first end portion 34, the nut and washer are removed and the sleeve 46 has its open end telescoped over the left end of the second end portion 38 to an extent with the second end portion 38 projecting through the aperture 50, note the phantom line position of the sleeve 46 in FIG. 3. Then, the nut 44 is again threaded on the second end portion 38 behind the sleeve 46 to engage the left end of the end wall 48. Thereafter, further threading of the nut 44 onto the end portion 38 will force the sleeve 46 to the right as viewed in FIG. 3 of the drawings and thus further force the hub portion 28 of the pulley 26 onto the intermediate length portion 16 until the right end of the hub portion 28 abuts the shoulder 56 as the pulley 26 is fully installed on the shaft 12. At this point, the shank member 32 may be removed and the pulley-retaining nut (not shown) may be threaded on the free end portion 14 of the shaft 12 behind an appropriate washer (not shown).

Thus, it may be seen that the tool 30 may be conveniently used to install the pulley 26 upon the shaft 12, even though there exists a very restricted space between the free end portion 14 of the shaft 12 and the radiator 24.

It may be noted that a simple sleeve, threaded both externally and internally and of the inside and outside diameters which are equal to the inside and outside diameters of the first end portion 34 of the shank member 32, may be used in conjunction with a nut of an inside diameter to be threaded on such an externally threaded sleeve to force the hub portion 28 of the pulley 26 onto the intermediate length portion 16 of the shaft 12. However, the diagonal measurement (as measured between diametrially opposite portions of opposite ends of such a sleeve) will be greater than the diagonal dimension of the shank member 32 in view of the diametrically reduced second end portion thereof. Accordingly, the sleeve member 32 enables the tool 30 to be used in a more restricted spacing situation than that which would allow the use of the aforementioned simple internally and externally threaded sleeve of a constant diameter.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An accessory pulley installation tool for installing a pulley over and upon a shaft equipped with a reduced diameter threaded free terminal end and wherein only limited space is available axially outward of said free terminal end, said tool including a shank member including a first end portion defining an endwise outwardly opening threaded bore therein for threadingly receiving said threaded free terminal end therein and a second diametrically reduced externally threaded end portion, a washer adapted to engage the pulley and freely slidable on said second end portion and of an outside diameter greater than the outside diameter of said first end portion, a threaded abutment member threadingly engaged on said second end portion and of a size too great to be received through the center of said washer, a sleeve member freely slidable over said shank member first end portion, said sleeve member being shorter in length than said second externally threaded end portion and longer in length than said first end portion, said sleeve member including a centrally apertured end wall on one end thereof freely slidable on said second end portion of said shank member, the inside diameter of said sleeve member being greater than the outside diameter of said first end portion of said shank member, said sleeve member being positionable over said shank member from said second end portion thereof in lieu of said washer and with said sleeve member and threaded bore opening in the same direction, said abutment member being of a size too great to pass though said centrally apertured end wall, the terminal end of said second end portion of said shank member including connecting means for imparting manual rotary torque input to said second end portion of said shank member by a suitably shaped hand tool non-rotatably engaged with said second end portion terminal end, the diameter of said shank member second end portion being less than the diameter of said bore, said sleeve member, by being shorter than said second end portion of said shank member and by having an inside diameter greater than the outside diameter of said first end portion of said shank member and because said second end portion of said shank member is smaller in diameter than said first end portion of said shank member, being positionable closely adjacent one side of the free end of said shank member second end portion and disposed at generally 90° relative thereto and thereafter angularly displaceable 90° to a position telescoped over said shank member second end portion within an area extending outward of said free end a distance appreciably less than the length of said sleeve member.

* * * * *